No. 869,214. PATENTED OCT. 22, 1907.
J. C. ROSS.
SHOVEL.
APPLICATION FILED MAR. 21, 1907.

2 SHEETS—SHEET 1.

Witnesses:

Inventor:
John C. Ross,
By
Luther G. Hopper,
His Attorney

No. 869,214.
PATENTED OCT. 22, 1907.
J. C. ROSS.
SHOVEL.
APPLICATION FILED MAR. 21, 1907.
2 SHEETS—SHEET 2.
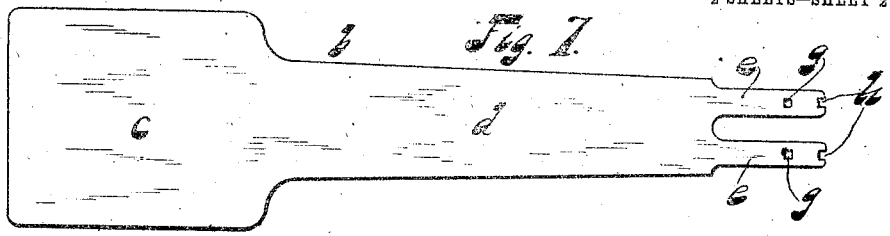
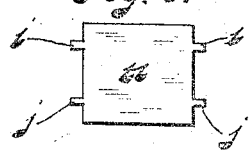 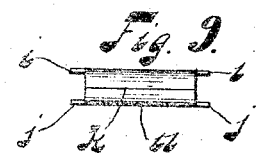
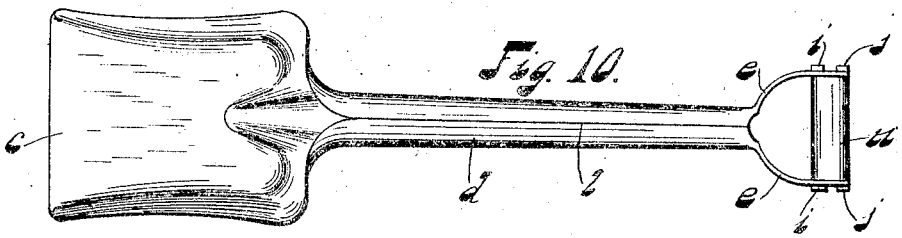
Witnesses:
Edw. Lindmueller
O. H. Collins
Inventor:
John C. Ross,
By

UNITED STATES PATENT OFFICE.

JOHN C. ROSS, OF ELYRIA, OHIO, ASSIGNOR TO THE ROSS STAMPING COMPANY, OF ELYRIA, OHIO, A CORPORATION OF OHIO.

SHOVEL.

No. 869,214.  Specification of Letters Patent.  Patented Oct. 22, 1907.

Application filed March 21, 1907. Serial No. 363,556.

*To all whom it may concern:*

Be it known that I, JOHN C. ROSS, a citizen of the United States, residing at Elyria, in the county of Lorain and State of Ohio, have invented certain new and useful Improvements in Shovels, of which the following is a specification.

This invention relates to improvements in shovels, spades, scoops and hand implements of a similar nature.

Primarily the present invention presents a new article of manufacture wherein a shovel or like implement having a blade, handle and D-shaped grip-handle is formed completely from a single blank of sheet metal.

A further object is to provide such an implement from a sheet of metal complete and integral, with the single exception of the grip-piece of the D-shaped handle, and to provide a grip-piece suitable therefor. Strength, durability and economy of production are obvious advantages of this construction.

The method of making such an implement forms the subject matter of and is more fully described in my application filed herewith and serially numbered 363,557 wherein I reserve the right to claim the method of making the implements shown herein; and handles therefor are further described and claimed in my application filed herewith, Serial No. 363,555, and in my application filed February 9th, 1906, Serial No. 300,261. The construction of the handles herein shown I reserve the right to claim specifically in the two last named applications respectively.

Figure 1:
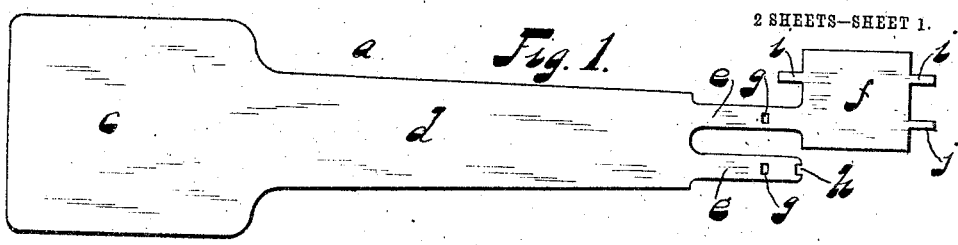
Figure 2:
Figure 3:
Figure 4:
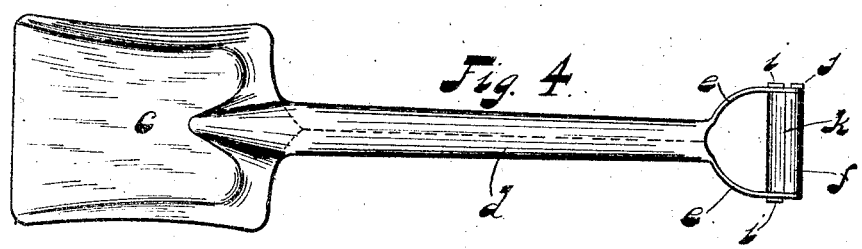
Figure 5:
Figure 6:
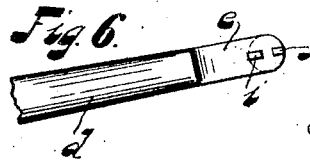

My present invention consists in the features and combinations hereinafter described and claimed, embodiments thereof being illustrated in the accompanying drawings, wherein Figure 1 is a plan view, and Fig. 2 is an edge view of a shovel blank as cut from sheet metal. Fig. 3 is a rear view, Fig. 4 is a front view, and Fig. 5 is a side view of a shovel formed integrally and completely from a single blank such as shown in Fig. 1. Fig. 6 is a side view of the handle end opposite that shown in Fig. 5. Fig. 7 shows a blank like Fig. 1, except that the grip-piece is not integral therewith. Fig. 8 is a sheet metal blank for a grip-piece, and Fig. 9 shows the grip-piece rolled into tubular form. Fig. 10 is a rear view of a shovel made from the blanks shown in Figs. 7 and 8. Fig. 11 is a side view of the handle end of Fig. 10.

The reference letter $a$ indicates a blank such as shown in Figs. 1 and 2, cut from sheet metal in the usual or any suitable way, and $b$ is a blank as shown in Fig. 7, being similar to the blank $a$ in all respects, except that it does not comprise the metal for forming the grip-piece. These blanks are cut preferably from sheet steel by suitably operated dies. The metal may be of a uniform thickness throughout the blank, or, which is preferred, one or more portions of the blank may be thicker than the other portions, as illustrated in Fig. 2.

The blank $a$ comprises a wide portion at one end the outline of which is suitable for forming the blade $c$ of a shovel, a middle portion of proper dimensions to be rolled up into a tubular intermediate handle $d$, two elongated tongues $e\ e$ projecting lengthwise from the end of the middle part $d$ which is farthest from the blade portion, and a substantially rectangular termination $f$ to one of the tongues $e$, as shown in Fig. 1. A small aperture $g$ is punched in each of the side arms $e$, and a recess is made in the end of the shorter side arm as shown at $h$ in Fig. 1. The rectangular wing $f$ carries a small projecting ear $j$ directly opposite its attachment to the blank, adapted to fit the recess $h$; and two similar ears $i\ i$ are oppositely disposed thereon adapted to fit the respective apertures $g$.

Speaking in general terms, the blank, after being cut out as described from a suitable sheet of metal, is operated upon by dies which form the blade $c$ and partly form the intermediate handle portion $d$. The blank is then placed between other dies which complete the tubular formation of the intermediate handle $d$; and while the part $d$ is held between dies is the preferable time for spreading and bending the side arms $e$, which may be done by a die moving lengthwise between said arms. The grip-piece $f$ is then bent to form a tube, preferably in two operations between dies, after which the attached arm $e$ is bent at its junction with the grip-piece, and the side arms sprung apart until the ears $i$ enter the apertures $g$ and the ear $j$ lies in the recess $h$. The D-handle is then closed up to the ends of the grip-piece, and the projecting ears $i$ and the ear $j$ bent down against the respective side arms. This completes the formation in the rough of a shovel such as shown in Figs. 3, 4, 5 and 6.

The blank $b$ is like the blank $a$, save that the handle end terminates in the two side arms $e$, as plainly shown in Fig. 7. The method of making a shovel from the blank $b$ is the same as described for blank $a$, except that part of it relating to the grip-piece. I make the apertures $g$ in the side arms, as in the other blank, making also a recess $h$ in each of the arms, and then cut out a sheet steel blank $n$, Fig. 8, with projecting ears $i$ and $j$, form it into a tube as in Fig. 9, and insert the ears $i$ in the respective apertures $g$ and the ears $j$ in the corresponding recesses $h$. The said ears being bent over and hammered or pressed down against the side arms, completes a shovel in the rough as shown in Figs. 10 and 11. The blanks $n$ may be cut from the scrap remaining of the original sheet from which the blanks $b$ are cut.

The edges of the intermediate handle seam $l$ may be welded, brazed, or otherwise held together. The joint $k$ of the grip-piece may also be welded, brazed, or otherwise secured, but for cheap shovels this operation may be avoided. Thus, a shovel is produced from a single sheet metal blank $a$, or from a single blank $b$ up to the grip-piece, or from a single sheet of metal from which the blanks $b$ and $n$ may be cut. After the formation in the rough as described, it is only necessary to sharpen the blade, and smooth and finish the implement ready for use.

I further point out and distinctly claim as my invention—

1. As a new article of manufacture, a hand implement comprising an intermediate handle with a digger blade at one end and a D-shaped grip handle at the other end, all integrally formed from a single sheet of metal, substantially as set forth.

2. As a new article of manufacture, a shovel comprising a digger blade, an intermediate handle and side arms for a grip handle formed from a single sheet metal blank, a tubular metallic grip-piece, and means for securing said grip-piece between and tying together said side arms, substantially as set forth.

3. As a new article of manufacture, a shovel comprising a blade, an intermediate handle, side arms for a grip handle and a hand-piece of a grip handle formed from a single sheet metal blank, and means for securing said hand-piece between said side arms, substantially as set forth.

4. As a new article of manufacture, a hand implement integrally formed from a single sheet of metal comprising a digger blade, an elongated tubular handle for said blade, side arms for a grip handle branching from the end of said tubular handle, and a tubular grip-piece integrally attached to one of said side arms and fixedly secured to the other side arm, substantially as set forth.

5. As a new article of manufacture, a hand implement formed of sheet metal comprising a digger blade, an elongated tubular handle for said blade, and side arms for a grip handle branching from the end of said tubular handle all formed from a single blank, and a tubular grip-piece fixedly secured at each end to the respective side arms, substantially as set forth.

6. A hand implement blanked out of sheet metal of varying thickness comprising the combination of a digger blade of heavier gage, a tubular handle for said blade of lighter gage, side arms for a grip handle branching from said tubular handle, a grip-member spanning the space between and tying together said side arms, and means for securing said grip-member to the respective end portions of said side arms, substantially as set forth.

7. In an implement of the class herein described, the combination with a digger blade, a tubular handle portion, and side arms for a grip handle integrally formed of a sheet metal blank, of a tubular grip-member bearing ears at its ends, said ears engaging and overlapping the respective side arms to hold the grip-member in place therebetween, substantially as set forth.

8. In an implement of the class herein described formed complete of a single blank of sheet metal, the combination of a digger blade, a tubular handle portion, a pair of side arms for a grip handle branching therefrom, a tubular grip-piece integral with one of said side arms, and projecting ears of said grip-piece adapted to engage the said side arms and hold said parts rigidly in place, substantially as set forth.

9. In an implement of the class herein described formed complete of a single blank of sheet metal, the combination of a digger blade, a tubular handle portion, a pair of side arms for a grip handle branching therefrom, a tubular grip-piece integral with one of said side arms, and ears projecting from the ends of said grip-piece engaging apertures in the respective side arms and bent down to overlap said side arms, substantially as set forth.

10. In an implement of the class herein described formed complete of a single blank of sheet metal, the combination of a digger blade, a tubular handle portion, side arms for a grip handle integral with and branching from one end of said handle portion, a tubular grip-piece having one end integral with one of said side arms, a dowel connection between the grip-piece and the attached side-arm, and projections upon the free end of the grip-piece engaging apertures in and overlapping the unattached side arm, substantially as set forth.

11. In an implement of the class herein described, the combination with a digger blade, a tubular handle therefor, and side arms for a grip handle continuing and branching outwardly from the same and provided with apertures, said parts being integrally formed of a sheet metal blank, of a tubular metallic grip-member transversely disposed between said side arms and provided with ears projecting through the said apertures, some of said ears engaging the outer faces of the side arms, substantially as set forth.

In testimony whereof I affix my signature in the presence of two subscribing witnesses at Cleveland, Ohio, this 6th day of March, 1907.

JOHN C. ROSS.

Witnesses:
F. F. HUNT,
C. H. COLLINS.